Feb. 6, 1962     E. G. COOK ETAL     3,019,637
ULTRASONIC TESTING ARRANGEMENT
Filed March 24, 1959
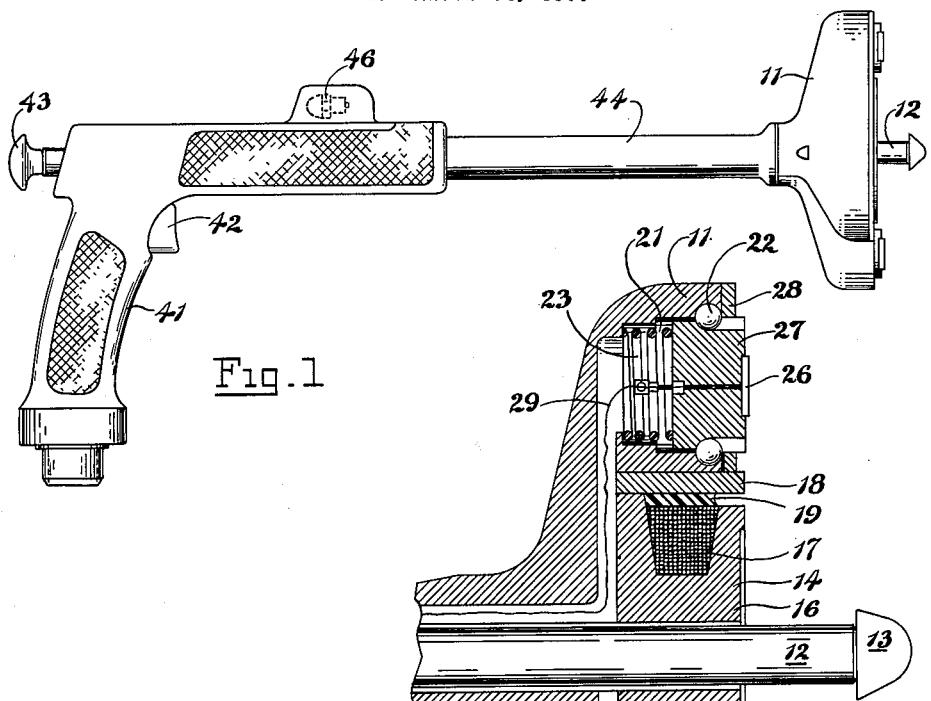
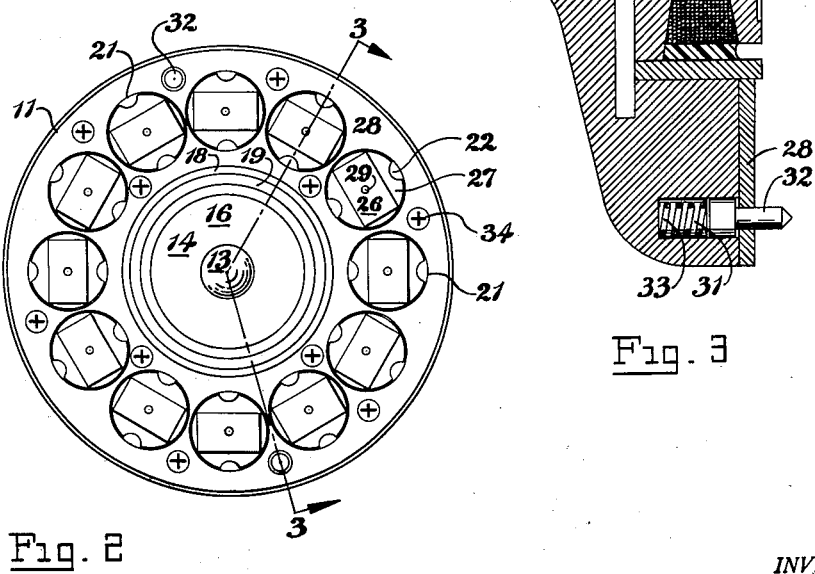
INVENTORS
EDWARD G. COOK
JULIUS F. TIBOLLA
CONSTANTINE FOUNDOS
BY Philip Mintz
ATTORNEY

United States Patent Office 3,019,637
Patented Feb. 6, 1962

3,019,637
ULTRASONIC TESTING ARRANGEMENT
Edward G. Cook, Morrisville, and Julius F. Tibolla, Yardley, Pa., and Constantine Foundos, Pennington, N.J., assignors to Curtiss-Wright Corporation, a corporation of Delaware
Filed Mar. 24, 1959, Ser. No. 801,652
4 Claims. (Cl. 73—67.7)

This invention relates to nondestructive testing of materials. More specifically, this invention relates to a new and improved portable probe arrangement for nondestructively testing an object by means of acoustic waves.

Nondestructive testing methods and apparatus are receiving wider and wider acceptace in industry, particularly where the limits to which different materials are subjected become more and more critical. One of the most useful methods for the nondestructive testing of objects lies in the field of ultrasonics wherein acoustic waves above the audible range are utilized for testing objects for internal and surface discontinuity flaws.

The conventional procedure is to utilize an electromechanical transducer, generally in the form of a piezoelectric crystal, which generates the ultrasonic waves which are transmitted into the object under test. A receiving transducer is responsive to the acoustic waves that pass through the material or which are reflected from the discontinuity flaw to provide some indication of the presence of a flaw within the area of the ultrasonic beam.

Since the area of the piezoelectric crystal used for a transmitter or receiver is generally substantially smaller than the object under test, it is necessary to provide some relative movement between the transducer and the object. In this manner, the entire volume of the object under test can be subjected sequentially to the action of the acoustic waves. Such testing arrangements take a subsantial amount of time and require very accurate indexing and scanning mechanisms so that no portions of the object are missed. In addition, a highly skilled operator must be present during the operation of the apparatus so that the nondestructive tests can be performed and interpreted properly.

Since ultrasonic waves are greatly attenuated by air, it is generally necessary to provide a positive contact between the transmitter and the object under test. When relative movement is required between the transducer and object, it is apparent that any substantial change in effective contact between the ultrasonic transducer and the object under test will cause an improper variation in the indication of the nondestructive testing instrument.

In order to decrease the amount of time required for ultrasonic nondestructive testing, the apparatus constructed in accordance with the principles of the present invention utilizes a plurality of transducers arranged in a preselected configuration for instantaneously testing the entire preselected portion of the object to be tested. Also to insure proper indication of the instrument, pressure equalizing means are provided for keeping the transducers and the object under test in effective contact with a predetermined pressure.

It is accordingly an object of the present invention to provide a new and improved ultrasonic testing apparatus which overcomes the disadvantages of the conventional testing arrangements.

It is a second object of the invention to provide an ultrasonic test probe which is small and portable and which may be used to examine instantaneously the entire volume of a preselected portion of the object to be tested.

A further object of the invention is to provide an ultrasonic testing probe having a plurality of electromechanical transducers arranged in an array wherein the transducers are spaced so that their acoustic beams overlap within the volume to be tested.

Another object is to arrange said transducers in the probe so that each transducer will at all times be in effective contact with the object under a reproducible substantially equal pressure even though the surface of said object may have some irregularities.

It is still another object of this invention to provide means attached to the head of the probe for effectively grounding the object to be tested to the housing of the probe.

With the above objects in view, the present invention mainly consists of a probe arrangement for nondestructively testing a preselected portion of an object including a plurality of electromechanical transducers and means for providing substantially equal and reproducible pressure between each of the transducers and the object when the transducers are in effective contact with the object.

In a preferred embodiment of the present invention, the transducers are maintained under the preselected pressure by resilient means which urge the transducers into effective contact with the object. Further, means are provided for maintaining this effective contact at such preselected pressure, whenever desired.

The novel features which are considered as characteristic for the invention are set forth in particular in the appended claims. The invention, itself, however, both as to its construction and its method of operation, together with additional objects and advantages thereof, will be best understood from the following description of specific embodiments when read in connection with the accompanying drawings, in which:

FIGURE 1 is a side view of the entire probe apparatus;

FIGURE 2 is a plan view of the end of the probe which is to be placed in effective contact with the object to be tested; and FIGURE 3 is a sectional view taken along line 3—3 of FIGURE 2.

Referring to the drawings, and more particularly to FIGURE 1, the manually operable portable probe apparatus is illustrated. The apparatus includes at one end portion thereof a housing 11 having a front face adapted to be urged against the object to be tested and properly located by means of a pilot 12. At the opposite end of the probe arrangement is a pistol grip member 41 having a trigger switch portion 42.

Projecting from the left hand portion of the probe apparatus as used in FIGURE 1 is a knob 43 of a lever connected to the pilot 12 and adapted to move the pilot 12 to the left, whenever desired. The specific apparatus illustrated is particularly applicable for use in testing railroad car axle journals wherein the pilot 12 is inserted in the exposed end portion of the axle and the housing 11 is urged against the axle. The pistol grip 41 is adapted to be held by the right hand while the remainder of the probe is supported at the elongated member 44 by the left hand.

The apparatus illustrated in FIGURE 1 is adapted to be connected by a cable (not shown) to an ultrasonic testing instrument having electrical generating means therein and having an indicator for displaying the results of the ultrasonic tests. In operation, the trigger switch 42 is depressed to connect the unillustrated ultrasonic instrument to the probe portion while the probe is held in effective contact with the object under test. The manner in which the probe provides the desired ultrasonic beam pattern will be described hereinbelow with respect to the remaining figures of the application.

Referring now to FIGURES 2 and 3, the housing 11 is shown suitably provided with a plurality of apertures therein for receiving and holding the various parts as hereinafter explained.

Within a central axial cavity, there is disposed the pilot 12 having a rounded head portion 13 adapted to center housing 11 on the end of the railroad axle to be tested. Pilot 12 is spring mounted so as to allow housing 11 to slide along pilot 12 toward head 13 after the head 13 has been inserted within a drilled centering hole in the surface of the end of the railroad axle to be tested.

Surrounding pilot 12 and mounted within housing 11 adjacent the face thereof is an electro-magnet 14. Electromagnet 14 is composed of core portion 16 and electrical windings 17 held in place in part by annular member 18 and resin 19. The electrical windings 17 are connected through the trigger switch 42 to the ultrasonic instrument by means of conductors passing through the handle of the probe.

Suitably disposed in housing 11 are a plurality of closely spaced drilled holes 21, each of which is shaped to provide recesses for ball bearings 22 and seating for a spring 23. Mounted within each hole 21 and supported upon the spring 23 and held in place by ball bearings 22 is a piezoelectre crystal 26 mounted upon backing member 27 forming an electromechanical transducer. As may be seen from the drawings, backing 27 is roughly cylindrical and has two semicircular grooves for receiving ball bearings 22. The ball bearings are held in their recesses in housing 11 by a face plate 28, thereby holding cylindrical backing members 27 within the drilled holes 21 in housing 11.

This novel resilient mounting for the transducers in the housing allows the transducers limited universal motion to properly seat themselves on irregularities of the surface against which they are to be maintained in effective contact, and enables a substantially equal and reproducible pressure to be applied between the transducers and the object under test. By limited universal motion is meant that the transducers can tilt in any direction a few degrees from their normal positions.

Electrically connected to the back of the crystal plate 26 is a conductor 29 which is threaded through internal spaces in housing 11 and which is connected to the ultrasonic instrument through coupling means connected to the handle 41. Each of the crystals 26 is oriented on its respective backing so as to be of the same polarity.

Housing 11 also is provided with a plurality of drilled holes 31, each of which is adapted to contain an electrical grounding contact 32 resiliently supported by spring 33. Face plate 28 also serves to retain electric grounding contact 32 within its orifice 31.

Face plate 28 is fixedly attached to housing 11 by means of screws 34.

To use this probe for ultrasonically testing a preselected portion of a railroad axle such as the journal area, the following procedure is used: The head 13 of pilot 12 is inserted in the drilled axial hole at the end of the axle to be tested. The electromagnet 14 is energized by operating the trigger switch 42. This establishes a magnetic field at the end of the probe which attracts the housing 11 to the face of the end of the railroad axle. Since the crystals 26 and the grounding contacts 32 protrude from the face of the probe, they are maintained in effective contact with the end of the axle with a pressure which is produced by the magnetic attraction as well as the resiliency of springs 23 and 33, respectively.

In this manner all of the crystals 26 are maintained in effective contact with the face of the end of the railroad axle with equal and substantially reproducible pressure. For contact testing, the head of the probe is first dipped in a bucket of an acoustic couplant such as oil or else the end of the railroad axle is sprayed with the couplant. The pressure provided by the magnetic attraction and the resilient spring is sufficient to provide effective coupling for the ultrasonic beam to pass into the railroad axle.

With this arrangement, the metallic axle is grounded by the resiliently urged grounding pins 32. The surface of the end of the axle thereby acts as the front electrode of the crystal 26 for energizing the transducer. Since very little oil is used as the acoustic coupling the dielectric constant is sufficient to permit the surface of the axle to perform as a front electrode.

If a non-conductive material were being tested or if the dielectric constant of the acoustic coupling were not in the proper range, a separate electrically conductive face plate could be utilized for the front surface electrode of each crystal 26.

The size of the transducers and the spacing between adjacent transducers are arranged in accordance with the cross-sectional area of the preselected portion of the axle to be tested. For example, if a tubular portion of the axle is to be tested, the spacing and size of the transducers are chosen so that the ultrasonic beams transmitted from the transducers overlap within the preselected portion under test and a beam having an annular cross-section is instantaneously provided when the transducers are energized. In the event there is any discontinuity flaw located within the preselected portion of the axle, a portion of this ultrasonic beam will be reflected from the flaw and it will return to one of the transducers. This transducer, acting as a receiver will convert the reflected ultrasonic beam into an electrical signal which is transmitted through the probe and displayed on the ultrasonic instrument or else is used for an aural or visible indication. For example, an indicator light 46, as shown in FIGURE 1, may be provided on the housing of the probe to indicate to the operator the presence of a flaw.

Since all of the crystals mounted on the face of the probe are arranged to have the same polarity, they will expand and contract in phase with each other if they are energized by the same driving voltage. Therefore, one method of operating the instrument is to simultaneously energize all of the transducers with the same driving voltage and thereby produce an instantaneous annular ultrasonic beam. This beam penetrates the preselected portion of the object under test and substantially instantaneously indicates the presence or absence of a discontinuity flaw.

The electro-mechanical transducers herein referred to may be of any known type, such as piezoelectric crystals, magnetostrictive materials (such as ferrites), electrostrictive materials (such as barium titanate), etc., with or without special damping materials.

The resultant advantage of the instrument is the provision of a manually operable portable probe device which can be easily carried and used by a single operator. It is apparent that the described arrangement does not require a highly skilled operator since it is a "go no-go" device. If a discontinuity flaw is present, the audible and visible indicator is energized and if no discontinuity flaw is present, the indicator will not be energized.

While the invention has been illustrated and described as embodied in a probe for acoustically testing the journal bearing surfaces of railroad axles, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for variout applications without omitting features that, from the standpoint of prior art, fairly constitute essential characteristics of the generic or specific aspects of this invention and, therefore, such adaptions should be and are intended to be comprehended within the meaning and range of equivalents of the following claims.

What is claimed as new and desired to be secured by Letters Patent is:

1. In a portable probe arrangement for use in nondestructively testing a preselected portion of an object, in combination, support means having a plurality of holes therein; a plurality of electro-mechanical transducers each positioned at least partially within one of said holes respectively in said support means, said transducers all being of like polarity and being so closely spaced that the ultrasonic beams produced upon actuation of said transducers overlap at least partially thereby effectively producing a single beam of relatively large cross-section within the preselected portion of the object being tested; springs urging each of said transducers outwardly from said holes in said support means; ball bearing means positioned between said support means and each of said electro-mechanical transducers to allow each transducer linear and limited universal motion with respect to said support means; and magnetic means for urging said support means into effective contact with the object under test whenever desired whereby each of said transducers is moved inwardly of said holes in said support means against the action of said springs so that each of said transducers is in effective contact with the object under test under a substantially equal and reproducible pressure.

2. Apparatus as defined in claim 1 for testing an object having a recess therein and including a center finder pin mounted on said probe for cooperating with said recess in said object for aligning said probe with said object.

3. Apparatus as defined in claim 1 including indicator means mounted on said probe for indicating the presence of flaws detected by said probe.

4. A portable go-no-go ultrasonic test probe for testing an object with a recess therein for defects comprising: a support having a plurality of holes therein; an electromechanical transducer positioned in each of said holes in said support, all of said transducers being of the same polarity and being so closely spaced that the ultrasonic beams produced upon actuation of said transducers overlap at least partially thereby effectively producing a single circular beam of relatively large cross section within the preselected portion of the object being tested; a spring secured in each of said holes for urging each of said transducers therein outwardly; ballbearing means positioned between said support means and each of said electromechanical transducers to allow each transducer linear and limited universal motion with respect to said support means; a center finder pin secured to said support means for cooperating with said recess in said object for aligning said support means with said object; and magnetic means secured in said support means for magnetically coupling said support means to said test object whereby said transducers are moved inwardly of said holes in said support means against the action of said springs to maintain said transducers in contact with said object under test under a substantially equal pressure.

References Cited in the file of this patent

UNITED STATES PATENTS

| | | |
|---|---|---|
| 1,848,538 | Mudd | Mar. 8, 1932 |
| 2,063,951 | Steinberger | Dec. 15, 1936 |
| 2,488,290 | Hansell | Nov. 15, 1949 |
| 2,645,938 | Billstein | July 21, 1953 |
| 2,728,062 | Klostermann | Dec. 20, 1955 |